Patented Nov. 18, 1952

2,618,629

UNITED STATES PATENT OFFICE 2,618,629

METHOD OF PRODUCING CASEIN

Philip C. Trexler, South Bend, Ind., assignor to Amino Acids, Inc., Wilmington, Del., a corporation of Delaware No Drawing. Application April 1, 1949, Serial No. 85,035

2 Claims. (Cl. 260—120)

This invention relates to the art of producing casein and has as its purpose to provide a method by which an acid casein of exceptionally low ash content and fine particle size can be produced on a commercial basis. The advantage of low ash content is obvious. Fine particle size facilitates use and packing of the casein.

While the art has recognized these advantages in a casein its only known method of achieving ash content below one percent (1%) was to repeatedly wash and precipitate the casein and its only known methods of securing fine particle size was to dry the casein curds by tray or tunnel drying and then grind the dried product or homogenizing the casein before spray drying. The cost of repeated washing and precipitation makes this practice prohibitive in the production of so-called commercial casein. Hence commercial casein heretofore available lacked the advantage of this low ash content. Likewise the special equipment needed for homogenization or the grinding step in itself constituted a definite item of cost in the production of the product. Spray dried soluble caseins are actually caseinates and are made by dissolving the casein with alkali to form a glue-like solution. The particles formed contain more water and dry much slower than the product of this invention; hence the drying process is more costly. Furthermore since the casein of this invention is isoelectric it disperses readily in water with no tendency to lump, in contrast to soluble caseins.

This invention achieves its objectives by the way in which the casein curd is produced and handled. The copending application of J. A. Reyniers, Serial No. 87,396, filed April 14, 1949, describes an improved method of precipitating acidulated skim milk with a view toward producing a fine flocculent casein of high nutritive value. The essential consideration in the method of that application is the precipitation of the skim milk at a relatively low temperature. This results in a fine curd of high nutritive value and low ash content but the separation of that fine curd from the whey presented a rather troublesome problem. This invention provides a solution for that problem.

In all past methods of producing low ash acid casein, including that of the aforesaid copending application, the curd is removed from the whey as soon as possible after its formation by precipitation. In fact, the art has generally believed that the retention of the curd in the whey for any appreciable time increases the ash content of the casein. For instance, Sutermeister, in his book "Casein and Its Industrial Applications" (2d edition, 1939) on page 126 states: "It is important to remove the whey as quickly as possible after securing the desired condition of the curd. Curd left too long in contact with the whey is more difficult to wash thoroughly * * *." It has been found, however, that very important and beneficial results are achieved by retaining the curd in the whey and heating this mixture.

The advantages of securing a firm, easily handled curd have been recognized in the prior art and past methods of producing acid casein have avoided practices known to obstruct the obtention of this result as for instance the use of an excessive amount of acid or too low a temperature during precipitation. However, the moist casein (curd) produced by past methods, except that of the aforesaid copending application, is in the form of rather large grains or lumps, the smallest being on the order of a wheat grain. Moreover, these grains or lumps secured by past methods have a high affinity for each other and adhere to form curds or larger lumps. In the past this has been considered desirable as it facilitated handling with conventional apparatus but it resulted in a casein of poor quality and high ash content. On the other hand, the moist casein of this invention has a grain size less than 0.5 mm. in diameter and these small grains will not adhere to one another. As a result the separation of the casein from the whey after the heating step which produced the fine grains is a simple matter. These small grains are dense and readily settle to the bottom. Consequently the whey may be decanted off, or the mixture may be passed through a filter, or separation may be effected in a centrifuge. In any event the rather dry granular form of the grains readily facilitates their removal from the whey. This overcomes the major problem of the method of the aforesaid copending application.

Another very important advantage achieved by the granular casein of this invention resulting from the heating thereof in the presence of the whey is that the product may be spray-dried, thereby eliminating the final grinding step necessary in the past where a fine particle size was needed in the final product. An example of the procedure to be followed in the application of the method of this invention is as follows:

1. To four quarts of skim milk cooled in any manner to 10° C. add normal hydrochloric acid to bring the pH of the milk to 4.6. The acid should be added at a rate of one and one-half (1½) milliliters per minute with sufficient agitation to prevent local acidification, and without allowing the mixture to increase in temperature beyond that to which it was cooled.

2. The acidified skim milk is then heated to raise its temperature to 70° C. The heating should be done in a water bath and the mixture stirred continuously to insure even heating.

3. After reaching the prescribed temperature the mixture is allowed to stand long enough to permit the fine granular casein curds which form during the heating step to settle down whereupon the whey may be decanted.

4. The remaining fine granular casein is then resuspended in acidified water to keep the pH at 4.6. This resuspension of the casein is done at room temperature.

5. After allowing the mixture to stand long enough for the casein to settle down the wash water is decanted.

6. The washing and decanting is repeated.

7. As much as possible of the moisture remaining in the precipitate is then removed by placing the precipitate in a filter sack and pressing by hand to squeeze out the moisture.

The product left in the filter sack is in the form of relatively dry non-adherent granules less than 0.5 mm. in diameter and containing less than forty-five percent (45%) by weight of moisture. Its proximate ash content on a dry basis varies between 0.53 percent and 0.86 percent. In comparison with other caseins (Sutermeister & Browne "Casein and Its Industrial Applications," 2d ed. 1939, pp. 165 and 166) the product of this invention can be grouped with the "Pure Caseins" made by laboratory and not strictly commercial processes.

Furthermore, the lactose content of the product of this invention is exceptionally low. Using the modified Folin-Wu method for lactose determination it has been found that the lactose content of the instant product is less than one-tenth that of casein precipitated at 37° C., and washed under comparable conditions.

The commercial caseins of the prior art cannot be disbursed in water as required for spray-drying, for upon immersion in water that product lumps into a cohesive mass having a soft, pasty feel, whereas the disbursion of the casein of this invention in water does not alter its firm, granular feel.

In the practice of this invention certain steps are critical. For instance, it has been found that the pH of the acidulated skim milk must be maintained between 4.4 and 4.8. If too low the particles become soft and have a tendency to adhere, and if too high a plastic mass similar to "cooked curd casein" is formed during the heating step. Also as in the method of the aforesaid copending application the temperature at which precipitation is conducted must be kept below 16° C. and preferably from 2° C. to 10° C. Temperature above 16° C. results in too large a grain size for the casein and a correspondingly higher ash content. In the heating of the casein-whey mixture best results are obtained when the mixture is heated to between 65° C. and 75° C. and preferably to 70° C. Below 65° C. the particles do not attain sufficient hardness to assure non-adhesion and above 75° C. some of the lactalbumin precipitates. While hydrochloric acid is specified in the example given, sulfuric acid or lactic acid may be used instead.

From the foregoing description it will be apparent to those skilled in the art that this invention makes possible the production of so-called commercial casein with an ash content far less than that heretofore possessed by such casein and that by virtue of the dense granular quality of the casein a finer, better product is produced.

Furthermore, this casein possesses the same nutritive value for suckling germ-free rats as the casein of the aforesaid copending application. Since all of the milk diets for germ-free animals must be steam sterilized, it is to be expected that the heating used in making this product does not harm the nutritional properties obtained by means of the low temperature precipitation. Comparative tests have shown this to be true so that at the present the casein produced by the process herein described is now used exclusively in the studies of germ-free rats referred to in the aforesaid copending application.

What I claim as my invention is:

1. In the method of making acid casein from skim milk which has been cooled to a temperature of between 2° C. and 16° C., and which method comprises precipitating casein from the cooled skim milk without raising the temperature thereof, by the addition of acid to bring the pH of the mixture to between 4.4 and 4.8; the characterizing step of heating the resulting mixture of whey and precipitated skim milk to a temperature of between 65° C. and 75° C.

2. In the method of making acid casein from skim milk which has been cooled to a temperature of between 2° C. and 16° C., and which method comprises adding acid to the cooled skim milk to bring the pH of the mixture to between 4.4 and 4.8 to thereby precipitate casein from the skim milk; the characterizing steps of: heating the mixture of whey and precipitated casein to a temperature of between 65° C. and 75° C.; separating the resultant solid particles from the whey; resuspending the solid particles in water and washing the same; separating the solid particles from the wash water; and drying the solids.

PHILIP C. TREXLER.

REFERENCES CITED

The following references are of record in the file of this patent:

UNITED STATES PATENTS

| Number | Name | Date |
|---|---|---|
| 2,518,493 | Reyniers | Aug. 15, 1950 |

OTHER REFERENCES

Sutermeister: "Casein and Its Industrial Applications," Reinhold, New York, 2d ed. 1939, pp. 20, 29 and 137 to 139.